US012552297B2

(12) United States Patent
Hewitt et al.

(10) Patent No.: US 12,552,297 B2
(45) Date of Patent: Feb. 17, 2026

(54) LOCATOR BRACKETS FOR FLUID RESERVOIRS, AND SEAT ASSEMBLIES AND VEHICLE INCLUDING THE SAME

(71) Applicant: Toyota Motor Engineering & Manufacturing North America, Inc., Plano, TX (US)

(72) Inventors: Brian J. Hewitt, Brighton, MI (US); Christopher A. Sarros, Tecumseh (CA); Andrew G. Schulte, Ypsilanti, MI (US); Stephen Clark, Highland, MI (US); Charles P. Patterson, Carleton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/583,077

(22) Filed: Feb. 21, 2024

(65) Prior Publication Data
US 2025/0262990 A1      Aug. 21, 2025

(51) Int. Cl.
*B60N 2/23*       (2006.01)

(52) U.S. Cl.
CPC .................. *B60N 2/231* (2013.01)

(58) Field of Classification Search
CPC ............................ B60N 2/231; B60N 2/914
USPC ............ 248/200, 503.1, 542, 543, 550, 570, 248/200.1, 352
See application file for complete search history.

(56) References Cited

U.S. PATENT DOCUMENTS

| | | | | |
|---|---|---|---|---|
| 3,024,067 A | * | 3/1962 | Brandoli | B60N 2/231 297/362.13 |
| 3,140,118 A | * | 7/1964 | Dorn | B60N 2/507 297/285 |
| 4,722,550 A | * | 2/1988 | Imaoka | A47C 7/467 280/727 |
| 4,742,981 A | * | 5/1988 | Converse | A61G 13/101 248/200.1 |

(Continued)

FOREIGN PATENT DOCUMENTS

| CN | 209454610 U | 10/2019 |
|---|---|---|
| CN | 212007637 U | 11/2020 |

(Continued)

OTHER PUBLICATIONS

1 Partial European Search report issued in EP Application No. 22850179.7 completed Apr. 28, 2025.

*Primary Examiner* — Muhammad Ijaz
(74) *Attorney, Agent, or Firm* — Dinsmore & Shohl LLP

(57) ABSTRACT

A locator bracket for attaching one or more fluid reservoirs to a seat assembly is disclosed. The locator bracket includes a connector member, a first receiving member provided at a first end of the connector bracket, and one or more clip holes formed in the connector bracket. The first receiving member includes a pressure gauge wall defining a pressure gauge receiving cavity, and a shaft wall extending from the pressure gauge wall and defining a shaft receiving indent. A pressure gauge of the one or more fluid reservoirs is received within the pressure gauge wall, and a shaft of the one or more fluid reservoirs is received within the shaft wall.

20 Claims, 7 Drawing Sheets

(56) References Cited

U.S. PATENT DOCUMENTS

| | | | | |
|---|---|---|---|---|
| 5,224,311 | A * | 7/1993 | Pearce | E04B 1/34347 |
| | | | | 52/146 |
| 5,730,522 | A * | 3/1998 | Wyke | F21V 19/00 |
| | | | | 248/300 |
| 11,084,403 | B1 * | 8/2021 | Muck | B60N 2/501 |
| 11,203,305 | B2 * | 12/2021 | Li | B60R 11/00 |
| 11,614,677 | B2 * | 3/2023 | Johnson, Sr. | F16B 2/065 |
| | | | | 396/428 |
| 11,738,698 | B1 * | 8/2023 | Rifkin | G03B 35/08 |
| | | | | 396/419 |
| 11,924,530 | B2 * | 3/2024 | Kovalev | G01S 7/003 |
| 2006/0217644 | A1 * | 9/2006 | Ozaki | A61H 9/0078 |
| | | | | 601/150 |
| 2011/0121628 | A1 * | 5/2011 | Kauffman | B60N 2/686 |
| | | | | 297/354.1 |
| 2013/0240690 | A1 * | 9/2013 | Florman | F21V 21/00 |
| | | | | 29/700 |
| 2017/0043690 | A1 * | 2/2017 | Dry | B60N 2/36 |
| 2017/0176987 | A1 * | 6/2017 | Deng | F16M 13/04 |
| 2018/0072187 | A1 * | 3/2018 | Katoh | B60N 2/682 |
| 2020/0307467 | A1 * | 10/2020 | Skinner | G03B 17/561 |
| 2021/0237629 | A1 | 8/2021 | Muck | |
| 2021/0237631 | A1 * | 8/2021 | Muck | B60N 2/501 |
| 2023/0036617 | A1 * | 2/2023 | Muck | F16F 9/3214 |
| 2025/0121750 | A1 * | 4/2025 | Hewitt | B60N 2/58 |
| 2025/0262990 | A1 * | 8/2025 | Hewitt | B60N 2/231 |

FOREIGN PATENT DOCUMENTS

| | | |
|---|---|---|
| CN | 111310914 B | 5/2022 |
| DE | 102017217664 A1 | 4/2019 |
| JP | 3770452 B2 | 4/2006 |

\* cited by examiner

LOCATOR BRACKETS FOR FLUID RESERVOIRS, AND SEAT ASSEMBLIES AND VEHICLE INCLUDING THE SAME

TECHNICAL FIELD

The present specification generally relates to locator brackets for attaching components to a vehicle seat and, more specifically, locator brackets for attaching a pair of fluid reservoirs to a movable seat of a vehicle.

BACKGROUND

It has been known to provide a seat assembly including a seat back and a seat cushion that mimic the walking movement of an occupant's pelvis and torso. Specifically, the known seat assembly allows a movable portion of the seat cushion to pivot at a cushion pivot axis and a movable portion of the seat back to pivot at a seat back pivot axis relative to a fixed portion of each of the seat cushion and the seat back. The movement is controlled by a plurality of dampers extending between the movable and fixed portions of the seat cushion and the seat back. However, it may be desirable to allow for a user selectively control the amount of movement between the movable and fixed portions of the seat cushion and the seat back. Accordingly, fluid reservoirs having controls accessible at a rear of the seat assembly may be utilized to control the flow of fluid to the respective dampers. However, these fluid reservoirs are difficult to position when installing on the seat assembly to ensure that the controls remain accessible at the rear of the seat assembly.

Accordingly, a need exists for a locator bracket that assists in properly positioning a fluid reservoir onto a seat assembly to ensure that controls of the fluid reservoirs remain specifically positioned so as to allow access by a user after a cover is placed over the rear of the seat assembly.

SUMMARY

In one embodiment, a locator bracket includes: a connector member having a first end, a second end opposite the first end, and one or more clip holes; and a first receiving member provided at the first end of the connector member, the first receiving member including: a pressure gauge wall defining a pressure gauge receiving cavity; and a shaft wall extending from the pressure gauge wall and defining a shaft receiving indent.

In another embodiment, a seat assembly includes: a primary seat back frame; a locator bracket removably attached to the primary seat back frame; a first fluid reservoir; and a second fluid reservoir, each of the first fluid reservoir and the second fluid reservoir including: a pressure gauge received within the locator bracket; and a shaft received within the locator bracket.

In yet another embodiment, a vehicle includes: a passenger compartment; and a seat assembly within the passenger compartment, the seat assembly including: a primary seat back frame; a locator bracket removably attached to the primary seat back frame; a first fluid reservoir; and a second fluid reservoir, each of the first fluid reservoir and the second fluid reservoir includes: a pressure gauge received within the locator bracket; a shaft received within the locator bracket; and a pressure valve extending from the shaft.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
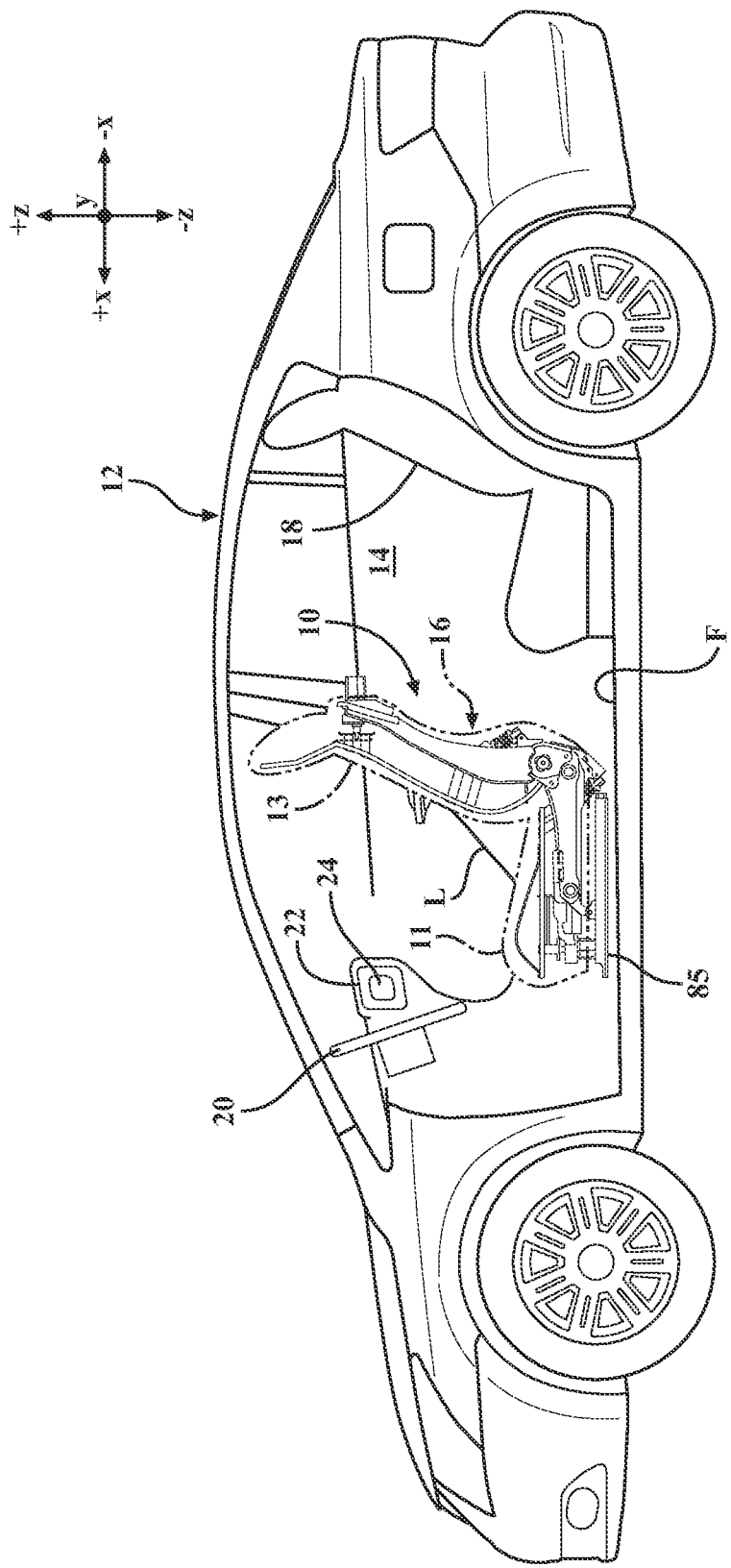
FIG. 1 schematically depicts a vehicle including a kinetic seat assembly, according to one or more embodiments shown and described herein.

FIG. 1 generally depicts an environmental view of an embodiment of a vehicle including a kinetic seat assembly. The vehicle general comprises a passenger compartment which passengers or other occupants occupy. A plurality of vehicle seats including a front driver seat, front passenger seat, and one or more rear passenger seats may be provided within the passenger compartment of the vehicle.

During a turning operation, the occupant and the kinetic seat assembly receives a force pushing the occupant and the kinetic seat assembly in an opposite direction of the turning operation. However, a secondary seat cushion frame and a secondary seat back frame of the kinetic seat assembly rotate in the direction of the force and in phase with one another relative to a primary seat cushion frame and a primary seat back frame of the kinetic seat assembly. As used herein, the term "in phase" describes two objects, for example, the secondary seat cushion frame and the secondary seat back frame, moving synchronously with one another in the same direction. As such, the term "out of phase" as used herein describes two objects, for example, the secondary seat cushion frame and the secondary seat back frame, not moving synchronously and in the same direction with one another. Further, it should be understood that when two objects are moving in phase with one another, the directions in which those object are moving are similarly in phase with one another.

Embodiments described herein are directed to a locator bracket for attaching one or more fluid reservoirs to the kinetic seat assembly. The locator bracket includes a connector member, a first receiving member provided at a first end of the connector bracket, and one or more clip holes formed in the connector bracket. The first receiving member includes a pressure gauge wall defining a pressure gauge receiving cavity, and a shaft wall extending from the pressure gauge wall and defining a shaft receiving indent. A pressure gauge of the one or more fluid reservoirs is received within the pressure gauge wall, and a shaft of the one or more fluid reservoirs is received within the shaft wall. Various embodiments of the locator bracket are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings. Further, the term "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard," and "outward" refer may be mirrored about the vehicle centerline when evaluating components positioned along opposite sides of the vehicle.

As used herein, the term "kinetic seat vertical direction" refers to the same direction as the vehicle vertical direction. In a configuration in which the kinetic seat assembly is a normal, front-facing seat in a vehicle, the term "kinetic seat longitudinal direction" refers to a direction parallel to the vehicle longitudinal direction. However, it should be appreciated that other configurations are contemplated in which the kinetic seat assembly is oriented in a direction in which the kinetic seat longitudinal direction is perpendicular, i.e., parallel to the vehicle lateral direction, or some other direction therebetween.

Also used herein, it is to be understood that the "turning direction" means a direction in which the occupant is turning the vehicle. Similarly, "counter-turning direction" means a direction opposite the turning direction.

Reference will now be made in detail to various embodiments of the kinetic seat assembly described herein, examples of which are illustrated in the accompanying drawings. Whenever possible, the same reference numerals will be used throughout the drawings to refer to the same or like parts.

Referring to FIG. 1, a vehicle is generally illustrated at 12. The vehicle 12 includes a passenger compartment 14 provided in an interior thereof. The passenger compartment 14 is a portion of an interior of the vehicle 12 which passengers or other occupants occupy. A plurality of vehicle seats including a driver seat 16, front passenger seat (not shown), and one or more rear passenger seats 18, such as second row passenger seats or third row passenger seats, are provided within the passenger compartment 14 of the vehicle 12.

In FIG. 1, the driver seat 16 is provided as a kinetic seat assembly 10. However, the kinetic seat assembly 10 is not limited to the driver seat 16. In embodiments, any one or any combination of the driver seat 16, the passenger seat, and the one or more rear passenger seats 18 may be provided as the kinetic seat assembly 10.

In FIG. 1, the vehicle 12 is provided as an automobile which includes coupes, sedans, minivans, trucks, crossovers, hybrids, and sports utility vehicles. However, the kinetic seat assembly 10 is not limited to automobiles. In embodiments, the kinetic seat assembly 10 may be provided in any vehicle 12 such as a watercraft, aircraft, or the like. In embodiments, the kinetic seat assembly 10 may be provided outside of a vehicle.

The vehicle 12 includes a steering wheel 20 located in front of the driver seat 16 in the vehicle longitudinal direction. The vehicle 12 includes a display unit 22 and a user interface 24. In some embodiments, the user interface 24 includes manual buttons or touchscreen controls provided on the display unit 22. It is appreciated, that the vehicle 12 in which the kinetic seat assembly 10 is provided may be an autonomous vehicle in which no steering wheel 20 is provided.

In use, the occupant controls the turning direction of the vehicle 12 by rotating the steering wheel 20. In doing so, the turning direction side shoulder of the occupant moves downward relative to the counter-turning direction side shoulder, and the turning direction side shoulder moves rearward relative to the counter-turning direction side shoulder. At this time, a steering operation can be comfortably performed if the occupant bends the lumbar spine in the turning direction and shortens a distance between the turning direction side pelvis and the shoulder compared to a distance between the counter-turning direction side pelvis and the shoulder, twists the lumbar spine, and pivotally moves the pelvis in the same direction as the turning direction side shoulder.

When the occupant directs the vehicle 12 in a turning direction, a force is applied onto the vehicle 12 and, thus, the occupant in the counter-turning direction. In a standard vehicle seat not equipped with moving to compensate for this force and allow the occupant to adjust a pelvis or torso position, the occupant will exhibit strain on these joints, including the knees, waist, and shoulders. In a seat in which the seat cushion frame and the seat back frame rotate in opposite directions, this strain on the occupant's joints is magnified.

The present disclosure seeks to eliminate these joint stresses by permitting the occupant seated in the kinetic seat assembly 10 to rotate with the force exhibited on the vehicle 12 during a turn. Thus, the present kinetic seat assembly 10 allows the pelvis and the torso of the occupant to rotate in order to maintain a center of gravity within the vehicle 12 in the direction of the turn.

As the occupant turns the vehicle 12 to the right, the occupant lowers the right shoulder and uses the trunk muscle so as to bend the lumbar spine to the right. This causes the occupant to pivotally move the pelvis counterclockwise in the rolling direction and clockwise in the yaw direction. In addition, the occupant pivotally moved the torso counterclockwise in the rolling direction and clockwise in the yaw direction. During a turn to the right, force is applied onto the occupant to the left. This further facilitates rotation of the torso and pelvis of the occupant to the left due to the momentum of the vehicle 12.

An imaginary line L extends from a front pivot point and an upper pivot point of the kinetic seat assembly 10. With respect to an occupant seated in the kinetic seat assembly 10, the line L generally extends through the shoulders of the occupant and the knees of the occupant. Thus, during use of the kinetic seat assembly 10, when undergoing movement during a right turn or a left turn, the kinetic seat assembly 10 ensures that the shoulders of the occupant and the knees of the occupant remain generally aligned with one another while allowing the occupant's waist to move in respective left and right directions in accordance with the above disclosure.

Figure 2:
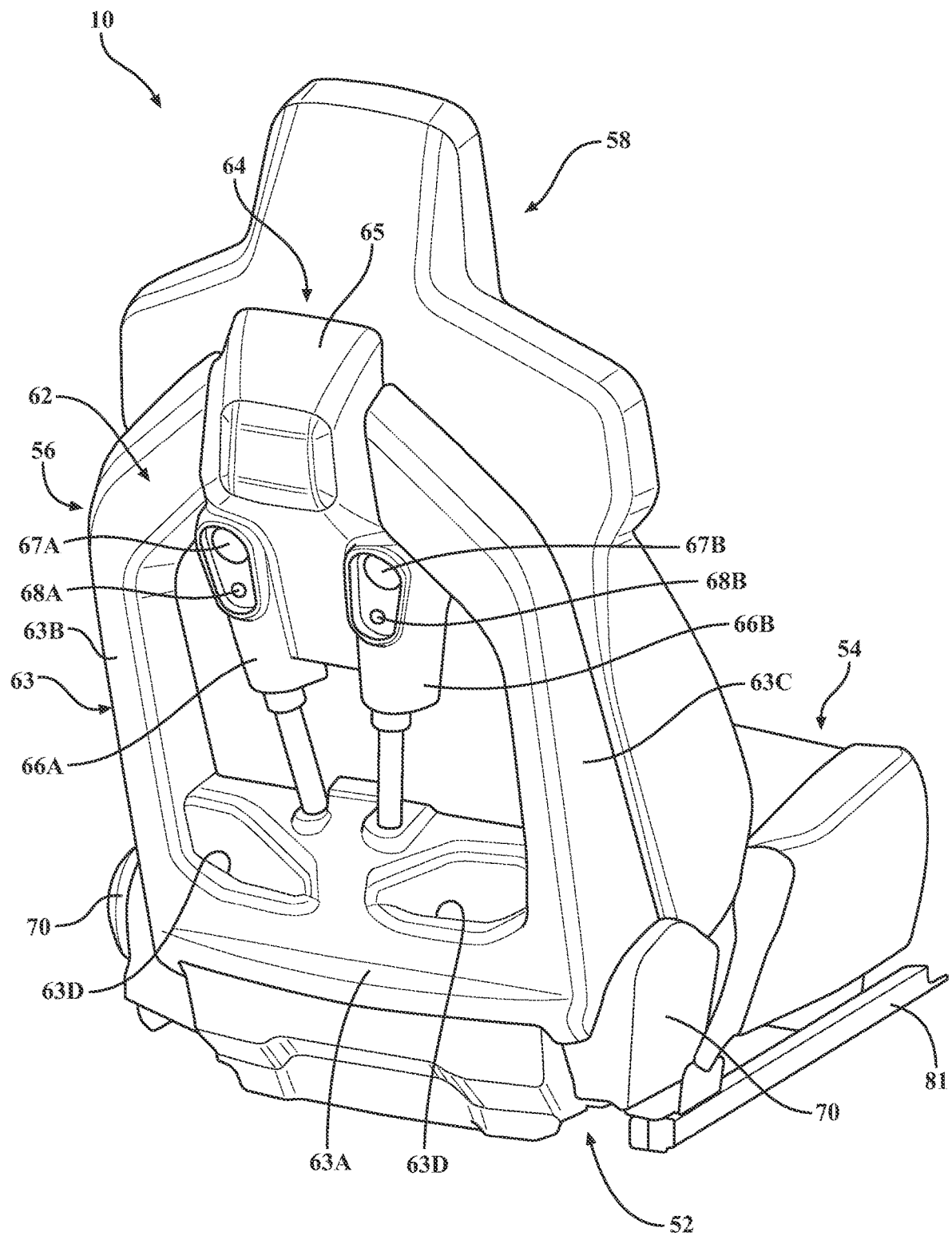
FIG. 2 schematically depicts a perspective view of the kinetic seat assembly, according to one or more embodiments shown and described herein.

Referring now to FIG. 2, the kinetic seat assembly 10 is shown and generally includes a primary seat cushion frame 52, a secondary seat cushion frame 54 pivotally connected to the primary seat cushion frame 52, a primary seat back frame 56, and a secondary seat back frame 58 pivotally connected to the primary seat back frame 56. Although not depicted, it should be appreciated that the primary seat cushion frame 52 is pivotally connected to the secondary seat cushion frame 54 at a front end thereof by any suitable mechanism such as, for example a ball joint or the like. Similarly, although not depicted, it should be appreciated that the primary seat back frame 56 is pivotally connected to the secondary seat back frame 58 at an upper end thereof by any suitable mechanism such as, for example a ball joint or the like.

It should be appreciated that, as shown in FIG. 1, the secondary seat cushion frame 54 includes padding 11 to support a pelvis, such as a buttocks and thighs, of an occupant, and that the secondary seat back frame 58 includes padding 13 to support a back of the occupant. The padding 11, 13 on the secondary seat cushion frame 54 and the secondary seat back frame 58 are omitted in the remaining figures to better illustrate the embodiments.

The kinetic seat assembly 10 may include a pair of recliner mechanisms 70 provided on opposite sides of the primary seat cushion frame 52 to facilitate rotation of the primary seat back frame 56 relative to the primary seat cushion frame 52. The kinetic seat assembly 10 may include a pair of rails 81 for slidably engaging a pair of tracks 85 mounted to a floor F of the passenger compartment 14 of the vehicle 12 (FIG. 1). Sliding the pair of rails 81 along the tracks 85 allows the occupant to move the kinetic seat assembly 10 forward or backward in the vehicle longitudinal direction in order to comfortably position the kinetic seat assembly 10 and the occupant with respect to the steering wheel 20 (FIG. 1) of the vehicle 12.

Referring again to FIG. 2, the primary seat back frame 56 includes a rear cover 62 provided on a rear side opposite the secondary seat back frame 58. The rear cover 62 is removably attached to a fixed portion of the primary seat back frame 56 in any suitable manner such as, for example, by using threaded fasteners, clips, clasps, or the like. The rear cover 62 includes an outer rear cover portion 63 and a central rear cover portion 64. In embodiments, the outer rear cover portion 63 and the central rear cover portion 64 are removable from one another. In other embodiments, the outer rear cover portion 63 and the central rear cover portion 64 are integrally molded as a one-piece, monolithic component.

The outer rear cover portion 63 includes a lower cover member 63A, a first side cover member 63B, and a second side cover member 63C. The first side cover member 63B and the second side cover member 63C extend from opposite ends of the lower cover member 63A. In embodiments, the lower cover member 63A includes a pair of lower openings 63D to provide visual inspection to otherwise hidden components, such as the lateral dampers 258, 260 described in more detail herein.

The central rear cover portion 64 is provided between the first side cover member 63B and the second side cover member 63C and extends from an upper end of the primary seat back frame 56 toward the lower cover member 63A. The central rear cover portion 64 includes a body member 65, a first receptacle 66A, and a second receptacle 66B. The first receptacle 66A and the second receptacle 66B are provided on opposite sides of the body member 65 and define respective cavities for receiving a pair of fluid reservoirs 334, 336, as described in more detail herein. A pressure gauge opening 67A, 67B and a pressure valve opening 68A, 68B are formed in each of the first receptacle 66A and the second receptacle 66B. The pressure gauge opening 67A, 67B and the pressure valve opening 68A, 68B are spaced apart from another along a respective one of the first receptacle 66A and the second receptacle 66B.

Figure 3:
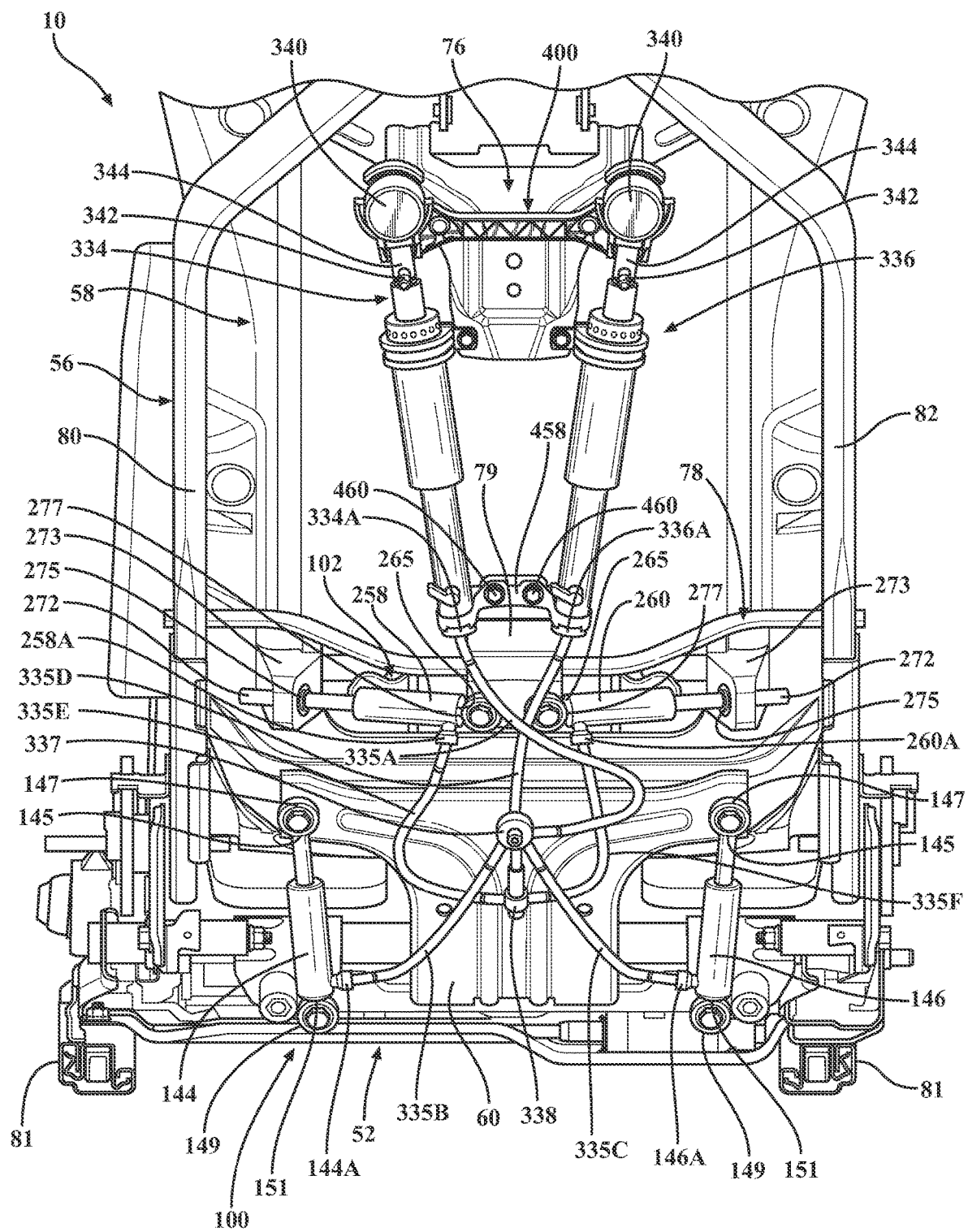
FIG. 3 schematically depicts a partial rear view of the kinetic seat assembly with a rear cover removed, according to one or more embodiments shown and described herein.

Referring now to FIG. 3, the primary seat back frame 56 is shown with the rear cover 62 removed to illustrate the internal components of the kinetic seat assembly 10 that facilitate movement of the primary seat cushion frame 52 (FIG. 2) relative to the secondary seat cushion frame 54, and the primary seat cushion frame 52 relative to the primary seat back frame 56. As shown, the primary seat back frame 56 may have a generally trapezoidal shape. The primary seat back frame 56 includes an upper member 76 provided proximate an upper portion thereof and a lower member 78 provided proximate a lower portion thereof. The upper member 76 extends toward the lower member 78 and includes a pair of locating holes formed at opposite sides of the upper member 76, and a pair of fastener holes formed at opposite sides of the upper member 76 below the locating holes. The lower member 78 traverses between a pair of opposing side members 80, 82. The lower member 78 includes a lower plate 79 extending upwardly therefrom and toward the upper member 76. The lower plate 79 is provided at a substantially center location between the side members 80, 82. A pair of lower holes and a pair of upper holes are formed in the lower plate 79. As described in more detail herein, the pair of lower holes are provided to facilitate coupling a lateral damping mechanism 102 to the primary seat back frame 56. Also described in more detail herein, the pair of upper holes are provided to facilitate coupling the fluid reservoirs 334, 336 to the primary seat back frame 56.

Referring still to FIG. 3, a linkage assembly 60 couples the secondary seat cushion frame 54 to the secondary seat back frame 58. Accordingly, the linkage assembly 60 ensures that the secondary seat cushion frame 54 and the secondary seat back frame 58 move in phase, i.e., in unison and in the same direction, with one another. As shown, the linkage assembly 60 is coupled to the rear surface of the secondary seat back frame 58.

Referring still to FIG. 3, a vertical damping mechanism 100 is depicted for facilitating a damping effect to the secondary seat back frame 58 and the secondary seat cushion frame 54 relative to the primary seat back frame 56 and the primary seat cushion frame 52. Additionally, a lateral damping mechanism 102 is depicted for facilitating a damping effect with respect to the secondary seat back frame 58 and the secondary seat cushion frame 54 relative to the primary seat back frame 56 and the primary seat cushion frame 52.

The vertical damping mechanism 100 includes first and second vertical dampers 144, 146 interconnecting the primary seat cushion frame 52 and the secondary seat cushion frame 54 due to the connection therebetween by the linkage assembly 60. The first and second vertical dampers 144, 146 include a ball joint 145 provided at a first end 147 thereof to rotatably couple the first and second vertical dampers 144, 146 to the linkage assembly 60, and a ball joint 149 at an opposite second end 151 thereof to rotatably couple the first and second vertical dampers 144, 146 to the primary seat cushion frame 52. The first and second vertical dampers 144, 146 each includes a fluid inlet 144A, 146A for receiving a fluid from a fluid supply.

The lateral damping mechanism 102 includes first and second lateral dampers 258, 260 for facilitating movement of the secondary seat back frame 58 relative to the primary seat back frame 56. The first and second lateral dampers 258, 260 includes a ball joint 277 at a first end 265 thereof to rotatably couple the first and second lateral dampers 258, 260 to the primary seat back frame 56, and specifically the lower plate 79. An opposite second end 272 of the first and second lateral dampers 258, 260 is slidably received in a hole 275 formed in a respective flange 273 extending from the rear surface of the secondary seat back frame 58. Accordingly, movement in a vehicle lateral direction allows the first and second lateral dampers 258, 260 to slide through the holes 275 and permit movement of the secondary seat back frame 58 relative to the primary seat back frame 56. The first and second lateral dampers 258, 260 each includes a fluid inlet 258A, 260A for receiving a fluid from a fluid supply.

Referring still to FIG. 3, the first fluid reservoir 334 is provided for delivering and receiving fluid to and from the vertical damping mechanism 100, specifically, the vertical dampers 144, 146. The second fluid reservoir 336 is provided for delivering and receiving fluid to and from the lateral damping mechanism 102, specifically, the lateral dampers 258, 260. In embodiments, the first fluid reservoir 334 may be provided for delivering fluid to and receiving fluid from the vertical dampers 144, 146 via a conduit 335A extending from an outlet 334A of the first fluid reservoir 334 to a vertical distributor 337. A pair of conduits 335B, 335C extends from the vertical distributor 337 to a fluid inlet 144A, 146A of a respective one of the vertical dampers 144, 146. Similarly, the second fluid reservoir 336 may be provided for delivering fluid to and receiving fluid from the lateral dampers 258, 260 via a conduit 335D from an outlet 336A of the second fluid reservoir 336 to a lateral distributor 338. A pair of conduits 335E, 335F extends from the lateral distributor 338 to a fluid inlet 258A, 260A of a respective one of the lateral dampers 258, 260.

It should be appreciated that a pressure within the fluid reservoirs 334, 336 directly affects a speed at which the vertical dampers 144, 146 and the lateral dampers 258, 260 return to an uncompressed state from a compressed state. For example, when the pressure within the fluid reservoirs 334, 336 is increased, the speed at which the fluid flows from the fluid reservoirs 334, 336 to the vertical dampers 144, 146 and the lateral dampers 258, 260 increases. Alternatively, when the pressure within the fluid reservoirs 334, 336 is decreased, the speed at which the fluid flows from the fluid reservoirs 334, 336 to the vertical dampers 144, 146 and the lateral dampers 258, 260 decreases. Additionally, it should be appreciated that a pressure within the fluid reservoirs 334, 336 directly affects a speed at which the vertical dampers 144, 146 and the lateral dampers 258, 260 moves from the uncompressed state to the compressed state. For example, when the pressure within the fluid reservoirs 334, 336 is increased, the force required to move the vertical dampers 144, 146 and the lateral dampers 258, 260 from the uncompressed state to the compressed state increases. Alternatively, when the pressure within the fluid reservoirs 334, 336 is decreased, the force required to move the vertical dampers 144, 146 and the lateral dampers 258, 260 from the uncompressed state to the compressed state decreases. The fluid reservoirs 334, 336 may be any suitable device for controlling the amount, as well as rate, of fluid provided to the vertical dampers 144, 146 and the lateral dampers 258, 260. The pressure within the fluid reservoirs 334, 336 may be caused by any compressible fluid such as, for example, air, steam, or gas.

In embodiments, the fluid reservoirs 334, 336 each includes a pressure gauge 340 for displaying or otherwise indicating a pressure within the fluid reservoirs 334, 336. The pressure gauge 340 may be any suitable display such as, for example, an analog gauge, a digital gauge, or the like. As shown, the pressure gauge 340 is mounted to an upper end of the fluid reservoirs 334, 336 opposite the outlets 334A, 336A.

The fluid reservoirs 334, 336 each further include a pressure valve 342. The pressure valve 342 may be any suitable valve for regulating the pressure within the fluid reservoirs 334, 336 such as, for example, a Schrader valve, a Presta valve, a Dunlop valve, and the like. The pressure valve 342 may be operated to set the pressure within a respective one of the fluid reservoirs 334, 336 and/or maintain the pressure within a set threshold. The pressure valve 342 may be controlled either manually or automatically in response to an external control unit transmitting a signal to an actuator communicatively coupled to the pressure valve 342.

As described in more detail herein, it is desirable to ensure that the fluid reservoirs 334, 336 are specifically positioned during installation on the primary seat back frame 56 and maintained in position after the rear cover 62 is installed such that the pressure gauge 340 and the pressure valve 342 of each fluid reservoir 334, 336 is received within or aligned with a respective pressure gauge opening 67A, 67B and a pressure valve opening 68A, 68B formed in the rear cover 62. Accordingly, the pressure gauge 340 and the pressure valve 342 of each fluid reservoir 334, 336 being aligned with a respective pressure gauge opening 67A, 67B and a respective pressure valve opening 68A, 68B permits the pressure gauge 340 and the pressure valve 342 of each fluid reservoir 334, 336 to be visible and/or accessible through the pressure gauge openings 67A, 67B and the pressure valve openings 68A, 68B. As shown in FIG. 3, a locator bracket 400 is provided for orienting and fixing the fluid reservoirs 334, 336 in position on the primary seat back frame 56 prior to installing the rear cover 62. As described in more detail herein, the locator bracket 400 is removably attached to the primary seat back frame 56.

Figure 4:
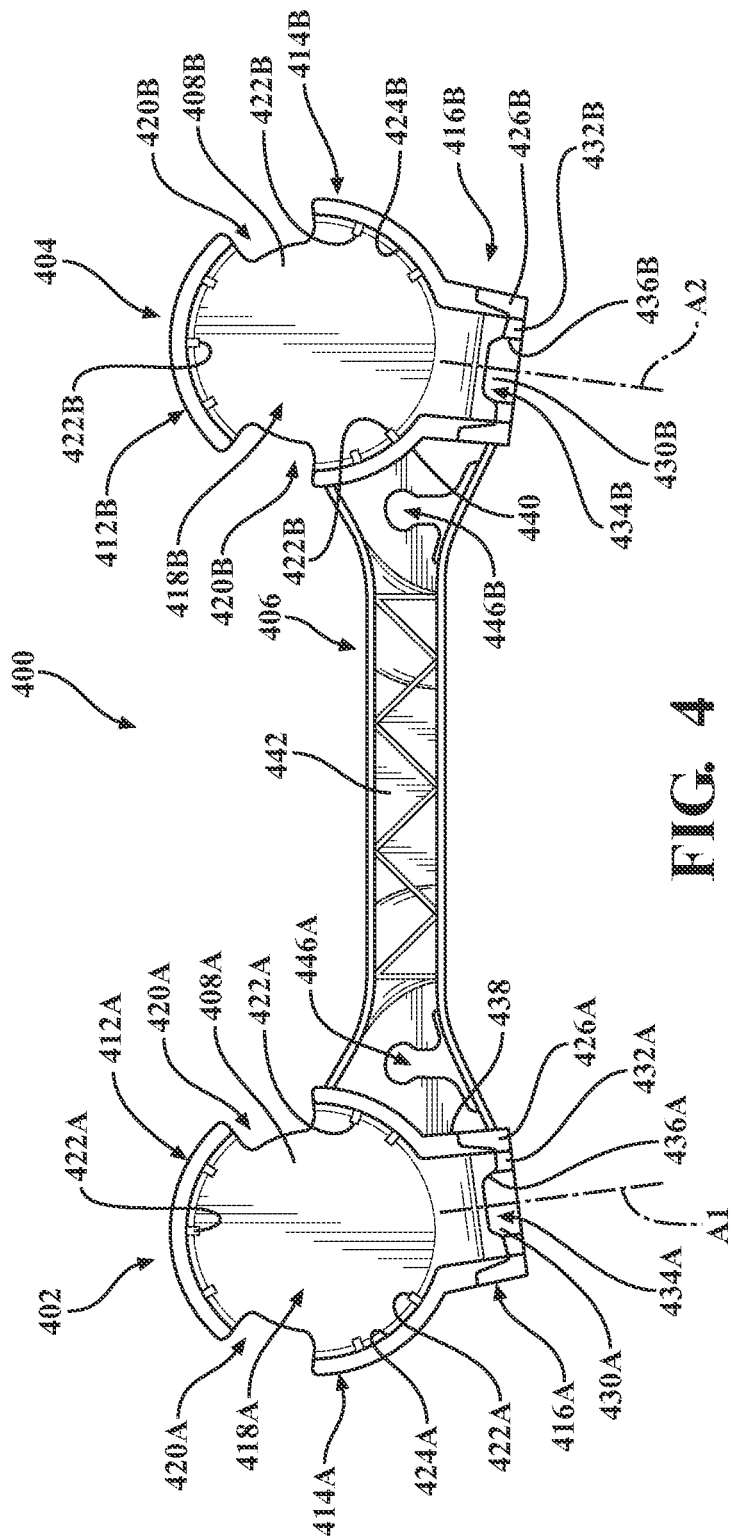
FIG. 4 schematically depicts a front view of a locator bracket of the kinetic seat assembly, according to one or more embodiments shown and described herein.
Figure 5:
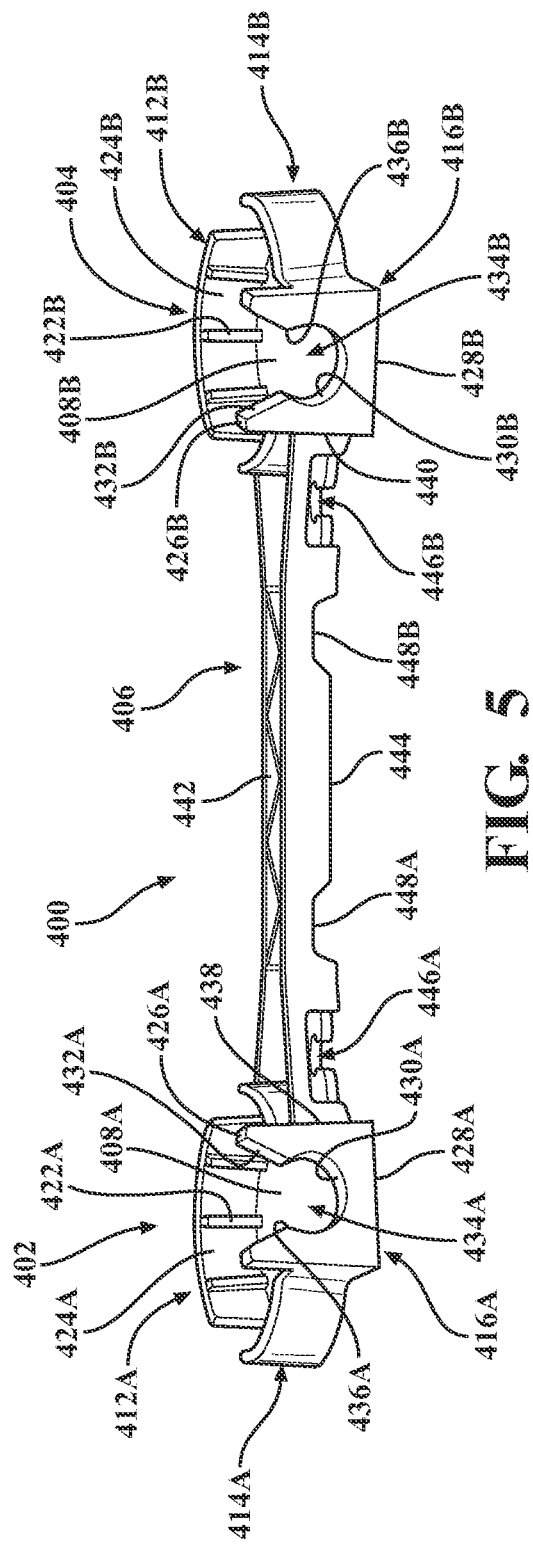
FIG. 5 schematically depicts a bottom perspective view of the locator bracket, according to one or more embodiments shown and described herein.
Figure 6:
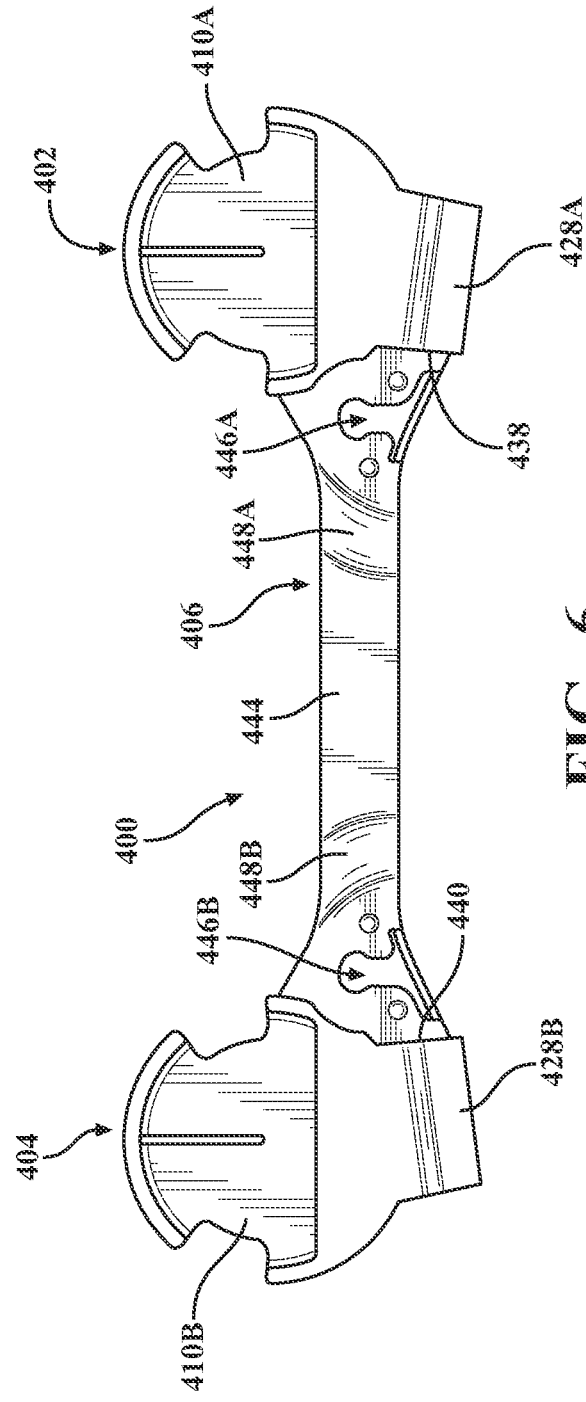
FIG. 6 schematically depicts a rear view of the locator bracket, according to one or more embodiments shown and described herein.

Referring now to FIGS. 4-6, the locator bracket 400 is illustrated separate from the primary seat back frame 56 and the fluid reservoirs 334, 336. The locator bracket 400 includes a first receiving member 402, a second receiving member 404 spaced apart from the first receiving member 402, and a connector member 406 extending between the first receiving member 402 and the second receiving member 404. Although the locator bracket 400 is described herein as including a first receiving member 402 and a second receiving member 404, it should be appreciated that, in embodiments, the locator bracket 400 may include only the first receiving bracket 402.

Figure 7:
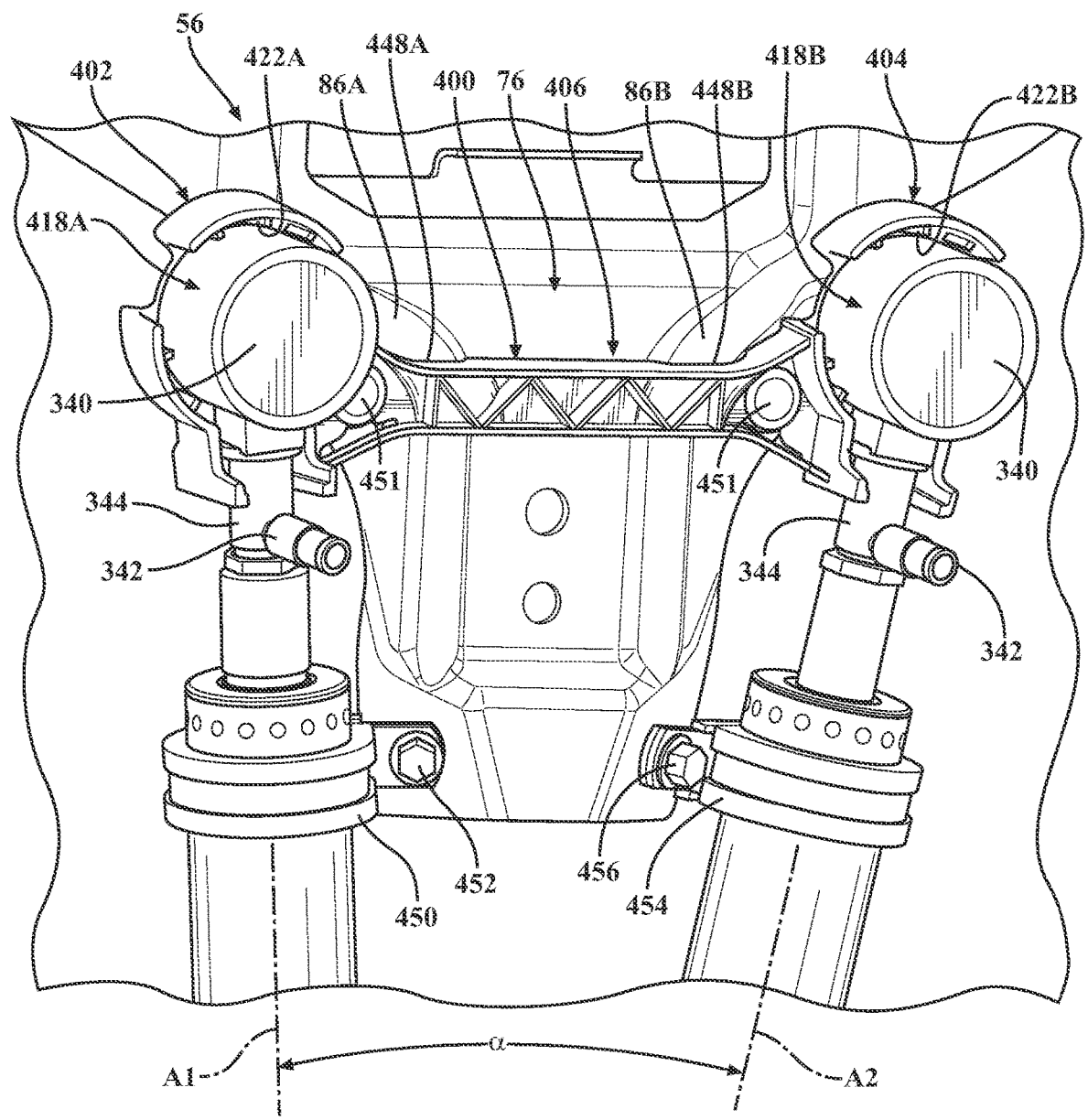
FIG. 7 schematically depicts a perspective view of the locator bracket mounted to a primary seat back frame of the kinetic seat assembly and receiving a pair of fluid reservoirs, according to one or more embodiments shown and described herein.

The first receiving member 402 has a front surface 408A and a rear surface 410A opposite the front surface 408A. The first receiving member 402 also includes a retaining wall 412A extending from the front surface 408A in a direction opposite the rear surface 410A. The retaining wall 412A includes a pressure gauge wall 414A and a shaft wall 416A extending from the pressure gauge wall 414A. In embodiments, the pressure gauge wall 414A has a substantially circular shape and defines a pressure gauge receiving cavity 418A. However, it should be appreciated that the pressure gauge wall 414A may have any suitable shape corresponding a shape of a pressure gauge 340 to be received within the pressure gauge receiving cavity 418A, as shown in FIG. 7.

As shown in FIG. 4, one or more cutouts 420A are formed in the pressure gauge wall 414A. Specifically, a pair of cutouts 420A are shown. These cutouts 420A may be formed to permit the locator bracket 400 to be provided against a portion of the primary seat back frame 56 without obstruction. Accordingly, it should be appreciated that any number of cutouts 420A may be formed in the pressure gauge wall 414A to accommodate the primary seat back frame 56. As shown in FIGS. 4 and 5, a plurality of ribs 422A extend radially inwardly from an inner surface 424A of the pressure gauge wall 414A and the front surface 408A of the first receiving member 402. In embodiments, as shown in FIG. 4, a plurality of ribs 422A are provided on the inner surface 424A of the pressure gauge wall 414A between the pair of cutouts 420A, and a plurality of ribs 422A are provided on the inner surface 424A of the pressure gauge wall 414A on opposite sides of the shaft wall 416A. In embodiments, as shown in FIG. 5, the ribs 422A have a length extending in an axial direction from the front surface 408A of the first receiving member 402 along an entire width of the pressure gauge wall 414A. However, in other embodiments, the length of the ribs 422A may be less than a width of the pressure gauge wall 414A.

Figure 8:
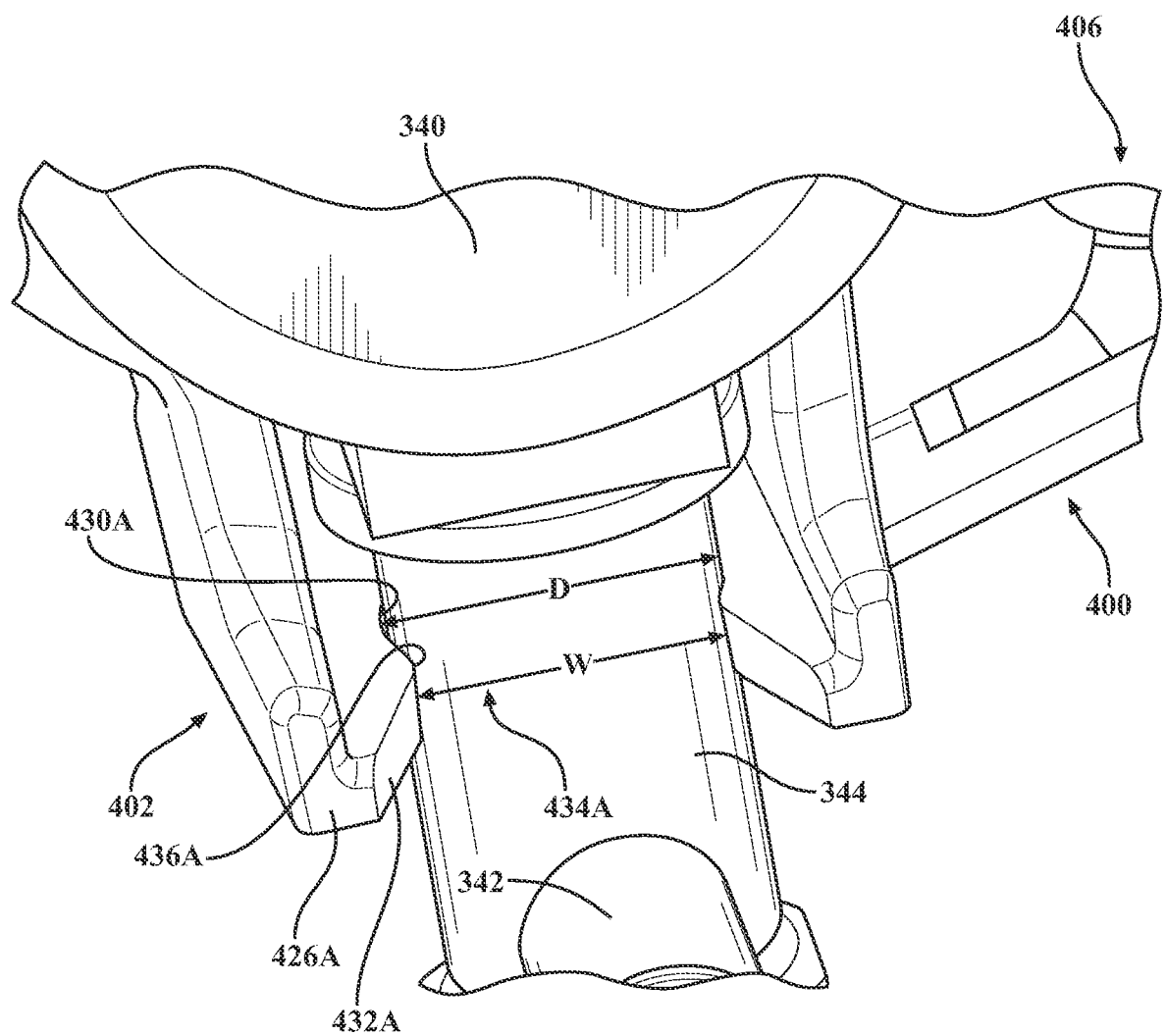
FIG. 8 schematically depicts a partial perspective view of a first receiving member of the locator bracket receiving a first fluid reservoir of the pair of fluid reservoirs, according to one or more embodiments shown and described herein.

Referring still to FIG. 5, the shaft wall 416A includes a front end 426A, a rear end 428A opposite the front end 426A, an inner wall 430A, and a tapered wall 432A extending from the inner wall 430A to the front end 426A. As shown in FIG. 5, the inner wall 430A has a substantially circular shape and defines a shaft receiving indent 434A. The shaft receiving indent 434A is open to the front end 426A of the shaft wall 416A. However, it should be appreciated that the inner wall 430A may have any suitable shape corresponding a shape of a shaft 344 of the fluid reservoirs 334, 336 to be received within the shaft receiving indent 434A, as shown in FIGS. 7 and 8. The shaft wall 416A defines a restriction feature 436A formed at an intersection of the inner wall 430A and the tapered wall 432A. As shown in FIG. 8, the restriction feature 436A has a width W less than a diameter D of the shaft receiving indent 434A, which is also less than a diameter of the shaft 344 of the fluid reservoirs 334, 336. Referring again to FIG. 4, a shaft axis A1 extends coaxial to the shaft receiving indent 434A. As described in more detail herein, in embodiments, the shaft axis A1 is oriented at a non-parallel angle relative to the vehicle vertical direction. In other embodiments, the shaft axis A1 is oriented parallel to the vehicle vertical direction.

The first receiving member 402 and the second receiving member 404 are identical in structure. Accordingly, similar to the first receiving member 402, the second receiving member 404 has a front surface 408B, a rear surface 410B opposite the front surface 408B, and a retaining wall 412B extending from the front surface 408B in a direction opposite the rear surface 410B. The retaining wall 412B includes a pressure gauge wall 414B and a shaft wall 416B extending from the pressure gauge wall 414B. As shown in FIG. 4, one or more cutouts 420B are formed in the pressure gauge wall 414B. As shown in FIGS. 4 and 5, a plurality of ribs 422B extend from an inner surface 424B of the pressure gauge wall 414B and the front surface 408B of the second receiving member 404. Referring still to FIG. 5, the shaft wall 416B includes a front end 426B, a rear end 428B opposite the front end 426B, an inner wall 430B, and a tapered wall 432B extending from the inner wall 430B to the front end 426B. As shown in FIG. 5, the inner wall 430B has a substantially circular shape and defines a shaft receiving indent 434B. The shaft receiving indent 434B is open to the front end 426B of the shaft wall 416B. As with the first receiving member 402, the shaft wall 416B of the second receiving member 404 defines a restriction feature 436B formed at an intersection of the inner wall 430B and the tapered wall 432B.

A shaft axis A2 extends coaxial to the shaft receiving indent 434B. As described in more detail herein, in embodiments, the shaft axis A2 is oriented at a non-parallel angle relative to the vehicle vertical direction. In other embodiments, the shaft axis A2 is oriented parallel to the vehicle vertical direction. More particularly, as shown in FIGS. 4 and 7, the shaft axis A1 of the first receiving member 402 and the shaft axis A2 of the second receiving member 404 are oriented non-parallel to one another. Even more particularly, the shaft axis A1 of the first receiving member 402 and the shaft axis A2 of the second receiving member 404 are oriented toward one another to form a V-shape such that a distance between the shaft axis A1 of the first receiving member 402 and the shaft axis A2 of the second receiving member 404 decreases in the downward vehicle vertical direction. In embodiments in which the shaft axis A1 and the shaft axis A2 are non-parallel to one another, an angle α between an intersection of the shaft axis A1 of the first receiving member 402 and the shaft axis A2 of the second receiving member 404 is greater than 0 degrees and less than 180 degrees. In embodiments, the angle α between an intersection of the shaft axis A1 of the first receiving member 402 and the shaft axis A2 of the second receiving member 404 is equal to or greater than 10 degrees and less than or equal to 60 degrees. In embodiments, the angle α between an intersection of the shaft axis A1 of the first receiving member 402 and the shaft axis A2 of the second receiving member 404 is equal to or greater than 20 degrees and less than or equal to 40 degrees.

Referring again to FIGS. 4-6, the connector member 406 extending between the first receiving member 402 and the second receiving member 404 is now described in more detail. The connector member 406 includes a first end 438, a second end 440 opposite the first end 438, a front surface 442, and a rear surface 444 opposite the front surface 442. The first receiving member 402 is provided at the first end 438 of the connector member 406, and the second receiving member 404 is provided at the second end 440 of the connector member 406. In embodiments, the first receiving member 402 is integrally formed with the first end 438 of the connector member 406, and the second receiving member 404 is integrally formed with the second end 440 of the connector member 406. Accordingly, the first receiving member 402, the second receiving member 404, and the connector member 406 may be collectively formed as a one piece, monolithic structure. In other embodiments, the first receiving member 402 and the second receiving member 404 may be removably fixed to the first end 438 and the second end 440 of the connector member 406, respectively, in any suitable manner such as, for example, using threaded fasteners, clips, and the like. In embodiments, the locator bracket 400 may be formed from any suitable material such as, for example, plastic, metal, rubber, and the like.

As shown in FIGS. 4 and 6, a pair of clip holes 446A, 446B are formed in the connector member 406 with each of the clip holes 446A, 446B proximate a respective one of the first end 438 and the second end 440 of the connector member 406. Specifically, the first clip hole 446A is formed closer to the first end 438 of the connector member 406 than the second end 440 of the connector member 406, and the second clip hole 446B is formed closer to the second end 440 of the connector member 406 than the first end 438 of the connector member 406. The clip holes 446A, 446B extend through the front surface 442 and the rear surface 444 of the connector member 406.

As shown in FIG. 6, a pair of grooves 448A, 448B are formed in the rear surface 444 of the connector member 406 with each of the grooves 448A, 448B proximate a respective one of the first end 438 and the second end 440 of the connector member 406. Accordingly, the pair of grooves 448A, 448B are spaced apart from one another. Specifically, the first groove 448A is formed closer to the first end 438 of the connector member 406 than the second end 440 of the connector member 406, and the second groove 448B is formed closer to the second end 440 of the connector member 406 than the first end 438 of the connector member 406. In embodiments, the grooves 448A, 448B have an arcuate shape.

Referring now to FIG. 7, the locator bracket 400 is shown positioned on the upper member 76 of the primary seat back frame 56 with a pair of protrusions 86A, 86B formed on opposite sides of the upper member 76 received within the grooves 448A, 448B formed in the rear surface 444 of the connector member 406 of the locator bracket 400. To fix the locator bracket 400 onto the primary seat back frame 56, specifically the upper member 76 of the primary seat back frame 56, a pair of clips 451 are utilized and inserted into a respective one of the clip holes 446A, 446B of the connector member 406 and through the locating holes formed in the upper member 76, as shown in FIG. 3. The clips 451 may be press-fit into the clip holes 446A, 446B of the connector member 406 and through the locating holes formed in the upper member 76.

Once the locator bracket 400 is fixed to the primary seat back frame 56, the fluid reservoirs 334, 336 are positioned relative to the locator bracket 400 and fixed thereto. Specifically, the first fluid reservoir 334 is oriented and positioned such that the pressure gauge 340 of the first fluid reservoir 334 is received within the pressure gauge receiving cavity 418A of the first receiving member 402. With the pressure gauge 340 received within the pressure gauge receiving cavity 418A, the pressure gauge 340 abuts against the ribs 422A. Accordingly, the ribs 422A reduce the amount of movement the pressure gauge 340 is susceptible to while positioned within the pressure gauge receiving cavity 418A.

Additionally, as shown in FIGS. 7 and 8, the shaft 344 of the first fluid reservoir 334 is received within the shaft receiving indent 434A of the first receiving member 402. More particularly, as shown in FIG. 8, the restriction feature 436A defined by the shaft wall 416A ensures a snap fit as the shaft 344 of the first fluid reservoir 334 is pressed into the shaft receiving indent 434A and retains the shaft 344 of the first fluid reservoir 334 within the shaft receiving indent 434A.

Thereafter, with the first fluid reservoir 334 properly positioned relative to the primary seat back frame 56, a fastening ring 450 positioned around the first fluid reservoir 334 may be secured to the upper member 76 of the primary seat back frame 56 via a threaded fastener 452 or the like, which extends through a hole formed in the fastening ring 450 and a respective fastener hole.

It should be appreciated that the second fluid reservoir 336 is secured to the locator bracket 400 and, thus, the primary seat back frame 56 in the same manner as described above with respect to the first fluid reservoir 334. Specifically, the pressure gauge 340 of the second fluid reservoir 336 is received within the pressure gauge receiving cavity 418B of the second receiving member 404, and a shaft 344 of the second fluid reservoir 336 is received within the shaft receiving indent 434B of the second receiving member 404. Thereafter, a fastening ring 454 positioned around the second fluid reservoir 336 is secured to the upper member 76 of the primary seat back frame 56 via a threaded fastener 456 or the like, which extends through a hole formed in the fastening ring 454 and a respective fastener hole.

Referring again to FIG. 3, a lower end of the first fluid reservoir 334 and the second fluid reservoir 336 opposite the locator bracket 400 is fixed to the lower member 78 to further secure the first fluid reservoir 334 and the second fluid reservoir 336 to the primary seat back frame 56. More particularly, the Specifically, the first fluid reservoir 334 and the second fluid reservoir 336 are fixed to the lower plate 79 of the lower member 78 via a lower bracket 458 circumscribing the lower end of the first fluid reservoir 334 and the second fluid reservoir 336. The lower bracket 458 is fixed to the lower plate 79 via a pair of fasteners 460 extending through respective upper holes formed in the lower plate 79.

From the above, it is to be appreciated that defined herein is a locator bracket for attaching one or more fluid reservoirs to a kinetic seat assembly. The locator bracket includes a connector member, a first receiving member provided at a first end of the connector bracket, and one or more clip holes formed in the connector bracket. The first receiving member includes a pressure gauge wall defining a pressure gauge receiving cavity, and a shaft wall extending from the pressure gauge wall and defining a shaft receiving indent. A pressure gauge of a respective one of the one or more fluid reservoirs is received within the pressure gauge wall, and a shaft of the one or more fluid reservoirs is received within the shaft wall.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A locator bracket comprising:
    a connector member having a first end, a second end opposite the first end, and one or more clip holes; and
    a first receiving member provided at the first end of the connector member, the first receiving member including:
        a pressure gauge wall defining a pressure gauge receiving cavity; and
        a shaft wall extending from the pressure gauge wall and defining a shaft receiving indent.

2. The locator bracket of claim 1, further comprising a second receiving member provided at the second end of the connector member, the second receiving member including:

a pressure gauge wall defining a pressure gauge receiving cavity; and a shaft wall extending from the pressure gauge wall and defining a shaft receiving indent.

3. The locator bracket of claim 2, wherein:

the one or more clip holes is a first clip hole and a second clip hole;

the first clip hole is located closer to the first end of the connector member than the second end of the connector member; and the second clip hole is located closer to the second end of the connector member than the first end of the connector member.

4. The locator bracket of claim 1, wherein a pair of grooves are spaced apart from one another and formed in a rear surface of the connector member, the pair of grooves having an arcuate shape.

5. The locator bracket of claim 2, further comprising a plurality of ribs extending radially inwardly from the pressure gauge wall of each of the first receiving member and the second receiving member.

6. The locator bracket of claim 4, wherein:

a pair of cutouts are formed in the pressure gauge wall of each of the first receiving member and the second receiving member; and the plurality of ribs are provided between the pair of cutouts, and between the pair of cutouts and the shaft wall.

7. The locator bracket of claim 1, wherein the shaft wall of each of the first receiving member and the second receiving member includes a front end, a rear end opposite the front end, an inner wall, and a tapered wall extending from the inner wall to the front end, the inner wall defines the shaft receiving indent.

8. The locator bracket of claim 7, wherein:

the shaft wall defines a restriction feature formed at an intersection of the inner wall and the tapered wall; and the restriction feature has a width less than a diameter of the shaft receiving indent.

9. The locator bracket of claim 1, wherein:

a shaft axis extends coaxial to the shaft receiving indent of each of the first receiving member and the second receiving member; and an angle between an intersection of the shaft axis of the first receiving member and the shaft axis of the second receiving member is equal to or greater than 20 degrees and less or equal to 40 degrees.

10. A seat assembly comprising:

a primary seat back frame;

a locator bracket removably attached to the primary seat back frame;

a first fluid reservoir; and a second fluid reservoir, each of the first fluid reservoir and the second fluid reservoir including:

a pressure gauge received within the locator bracket; and a shaft received within the locator bracket.

11. The seat assembly of claim 10, wherein:

the locator bracket comprises:

a first receiving member;

a second receiving member, each of the first receiving member and the second receiving member comprising:

a pressure gauge wall defining a pressure gauge receiving cavity; and a shaft wall extending from the pressure gauge wall and defining a shaft receiving indent; and a connector member having a first end, a second end opposite the first end, and a clip hole, the first receiving member provided at the first end of the connector member, the second receiving member provided at the second end of the connector member, wherein a clip is insertable through the clip hole to secure the locator bracket to the primary seat back frame.

12. The seat assembly of claim 11, wherein:

the primary seat back frame includes an upper member to which the locator bracket is removably attached, a pair of protrusions are formed on the upper member; and a pair of grooves are spaced apart from one another and formed in a rear surface of the connector member, the pair of grooves receiving the pair of protrusions.

13. The seat assembly of claim 11, wherein:

the shaft wall of each of the first receiving member and the second receiving member includes a front end, a rear end opposite the front end, an inner wall, and a tapered wall extending from the inner wall to the front end, the inner wall defines the shaft receiving indent; and the shaft of the first fluid reservoir and the second fluid reservoir is received within.

14. The seat assembly of claim 13, wherein:

the shaft wall defines a restriction feature formed at an intersection of the inner wall and the tapered wall; and the restriction feature has a width less than a diameter of the shaft receiving indent and a diameter of the shaft.

15. The seat assembly of claim 11, wherein:

a shaft axis extends coaxial to the shaft receiving indent of each of the first receiving member and the second receiving member; and an angle between an intersection of the shaft axis of the first receiving member and the shaft axis of the second receiving member is equal to or greater than 20 degrees and less or equal to 40 degrees.

16. A vehicle comprising:

a passenger compartment; and a seat assembly within the passenger compartment, the seat assembly comprising:

a primary seat back frame;

a locator bracket removably attached to the primary seat back frame;

a first fluid reservoir; and a second fluid reservoir, each of the first fluid reservoir and the second fluid reservoir including:

a pressure gauge received within the locator bracket;

a shaft received within the locator bracket; and a pressure valve extending from the shaft.

17. The vehicle of claim 16, wherein the primary seat back frame further comprises:

a rear cover having a central rear cover portion defining a first receptacle for receiving the first fluid reservoir, and a second receptacle for receiving the second fluid reservoir, the first receptacle and the second receptacle each comprising:

a pressure gauge opening aligning a pressure gauge of a respective one of the first fluid reservoir and the second fluid reservoir; and a pressure valve opening for receiving a pressure valve of a respective one of the first fluid reservoir and the second fluid reservoir.

18. The vehicle of claim 16, wherein:

the locator bracket comprises:

a first receiving member;

a second receiving member, each of the first receiving member and the second receiving member comprising:

a pressure gauge wall defining a pressure gauge receiving cavity; and a shaft wall extending from the pressure gauge wall and defining a shaft receiving indent, the shaft wall of each of the first receiving member and the second receiving member includes a front end, a rear end opposite the front end, an inner wall, and a tapered wall extending from the inner wall to the front end, the inner wall defines the shaft receiving indent.

19. The vehicle of claim 18, wherein:

the shaft wall defines a restriction feature formed at an intersection of the inner wall and the tapered wall; and the restriction feature has a width less than a diameter of the shaft receiving indent and a diameter of the shaft.

20. The vehicle of claim 18, wherein:

a shaft axis extends coaxial to the shaft receiving indent of each of the first receiving member and the second receiving member; and an angle between an intersection of the shaft axis of the first receiving member and the shaft axis of the second receiving member is equal to or greater than 20 degrees and less or equal to 40 degrees.

* * * * *